Patented Feb. 15, 1927.

1,618,095

UNITED STATES PATENT OFFICE.

AUGUST KLAGES, OF MAGDEBURG-SUDOST, GERMANY.

PROCESS FOR THE PRODUCTION OF NUCLEAR SUBSTITUTED AROMATIC CYANOGEN MERCURY COMPOUNDS.

No Drawing. Application filed September 1, 1921, Serial No. 497,669, and in Germany February 23, 1920.

Complex mercury compounds have been made already frequently. These are salt-like compounds which are not easily soluble and out of which the mercury cannot be precipitated by alkalies. The mercury compounds of the phenols are besides distinguished by easy decomposability. It has been discovered that the complex mercury compounds of the phenols, having the general formula

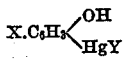

in which X means hydrogen or an alkyl and Y an acid substituent other than cyanogen, such as $SO_4H$, and which are not easily soluble can be transformed, by boiling with alkali metal cyanides, into permanent compounds forming very easily soluble alkali metal salts having the general formula

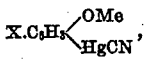

in which Me means an alkali metal. These mercury compounds are not altered by alkalies and not precipitated by sodium chloride solution. They are permanent, easily soluble and comparatively not very poisonous.

These compounds can be produced also directly by heating phenols in non-acid solution with mercuric oxide and alkali metal cyanides. By such boiling a solution of the easily soluble alkali metal salts of the corresponding phenol mercury cyanide compounds is formed directly, and the said mercury compounds may be precipitated from such solution by means of acids.

*Examples.*

1. Three kilograms of mercuric oxide are dissolved in 10 liters of water with addition of sulphuric acid and 1.5 kilograms of cresol is added to this solution while heating and stirring the solution. After a short time a precipitate of mercuric cresol sulphate

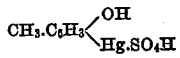

will separate. The precipitate is separated from the solution and then boiled up to complete solution, preferably while being still moist, together with a solution of 1 kilogram of sodium cyanide in 5 liters of water. The sodium sulphate precipitating from the solution is removed and the solution is evaporated in vacuo.

When cooling the concentrated solution the mercury cyanide compound having the formula

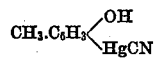

is precipitated and separated in any convenient manner.

2. 1.3 kilograms of phenol are heated to boiling and dissolved together with 3 kilograms of mercuric oxide and 680 grams of sodium cyanide in 10 to 15 liters of water. The mercuric oxide dissolves. From the cooled solution the phenol-mercury-cyanide compound having the formula

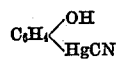

is separated by means of carbon dioxide or diluted acids, said compound being easily redissolved by alkali.

The alkali metal salts of the resulting phenol cyanide-mercury compounds which salts have the general formula

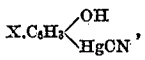

are specially adapted to be used as a fungicide for preserving wheat from blight and as remedy against other plant diseases.

I declare that what I claim is:—

1. A process for the production of complex cyan mercury derivatives of phenols having the general formula

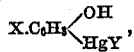

X meaning hydrogen or an alkyl, which process consists in treating a mercurized phenol having the formula

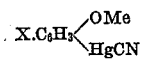

Y meaning an acid substituent other than cyanogen with an alkali metal cyanide.

2. A process for the production of complex cyan mercury derivatives of phenols, having the general formula $$X.C_6H_x\!\!\begin{array}{c}OH\\HgCN\end{array},$$

X meaning hydrogen or an alkyl, which process consists in treating in non-acid solution a phenol with an alkali metal cyanide in the presence of mercuric oxide, and precipitating the solution so obtained by means of an acid.

In testimony whereof I affix my signature.

AUGUST KLAGES.